United States Patent
Berry et al.

(10) Patent No.: US 6,195,693 B1
(45) Date of Patent: *Feb. 27, 2001

(54) METHOD AND SYSTEM FOR NETWORK DELIVERY OF CONTENT ASSOCIATED WITH PHYSICAL AUDIO MEDIA

(75) Inventors: Richard Edmond Berry, Georgetown; Shirley Lynn Martin, Austin; Scott Anthony Morgan, Austin; John Martin Mullaly, Austin; Craig Ardner Swearingen, Austin; Alan Richard Tannenbaum, Austin, all of TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,875

(22) Filed: Nov. 18, 1997

(51) Int. Cl.$^7$ .................................................. G06F 17/30
(52) U.S. Cl. ............................................. 709/219; 707/10
(58) Field of Search .................................... 709/218, 219, 709/217, 203; 348/460, 473; 707/10

(56) References Cited

U.S. PATENT DOCUMENTS

| | | | |
|---|---|---|---|
| 5,640,193 | * | 6/1997 | Wellner .................................... 348/7 |
| 5,761,606 | * | 6/1998 | Wolzien ................................. 455/6.2 |
| 5,774,666 | * | 6/1998 | Portuesi ................................. 709/218 |
| 5,892,825 | * | 4/1999 | Mages et al. ........................... 705/51 |
| 5,931,906 | * | 8/1999 | Fidelibus, Jr. et al. .............. 709/217 |
| 5,987,509 | * | 11/1999 | Portuesi ................................ 709/217 |
| 5,987,525 | * | 11/1999 | Roberts et al. ....................... 709/248 |
| 5,991,798 | * | 11/1999 | Ozaki et al. .......................... 709/217 |
| 6,047,292 | * | 4/2000 | Kelly et al. ........................... 707/104 |
| 6,061,680 | * | 5/2000 | Scherf et al. ............................. 707/3 |

OTHER PUBLICATIONS

Richard R. Reisman; CD–ROM/Online–Hybrids—The Missing Link; CD–ROM Professional, vol. 8, No. 4, Apr. 1995.*

Richard R. Reisman; Spin Webs Around a CD–ROM: The Next Generation of CD/Web Hybrids; Mass High Tech, Sep. 1996.*

M. Mascha et al.; Interactive Education: Transitioning CD–ROMs to the Web; Computer Networks and ISDN Systems, vol. 27, No. 2, pp. 267–272, Nov. 1994.*

* cited by examiner

*Primary Examiner*—Kenneth R. Coulter
(74) *Attorney, Agent, or Firm*—Leslie A. VanLeeuwen; Felsman, Bradley, Vaden, Gunter & Dillon, LLP

(57) ABSTRACT

A method and system in a multimedia computer system for automatically retrieving and presenting data associated with an audio recording having unique identifying indicia therein. In response to playing an audio recording in a multimedia computer system, a unique identifying indicia associated with the audio recording is identified. A listing of codes within the multimedia computer system is automatically searched to find a code corresponding to the unique identifying indicia. In response to finding the code corresponding to the unique identifying indicia, multimedia data is retrieved which corresponds to the unique identifying indicia. The multimedia data can be retrieved from local storage or from a remote network site. The multimedia data corresponding to the unique identifying indicia is then presented in the multimedia computer system, while playing the audio recording in the multimedia computer system.

30 Claims, 8 Drawing Sheets

METHOD AND SYSTEM FOR NETWORK DELIVERY OF CONTENT ASSOCIATED WITH PHYSICAL AUDIO MEDIA

BACKGROUND OF THE INVENTION

1. Technical Field

The present invention relates to improved information-retrieval methods and systems. In particular, the present invention relates to improved information-retrieval methods and systems utilized in association with graphical user interfaces. Still more particularly, the present invention relates to physical audio media and methods and systems for delivering content associated with such physical audio media via computer networks.

2. Description of the Related Art

The development of computerized information resources, such as remote networks, allows users of data-processing systems to link with other servers and networks, and thus retrieve vast amounts of electronic information heretofore unavailable in an electronic medium. Such electronic information is increasingly displacing more conventional means of information transmission, such as newspapers, magazines, and even television.

In communications, a set of computer networks which are possibly dissimilar from one another are joined together by "gateways" that handle data transfer and the conversion of messages from the sending network to the protocols used by the receiving network, with packets if necessary. A gateway is a device used to connect dissimilar networks (i.e., networks utilizing different communication protocols) so that electronic information can be passed from one network to the other. Gateways transfer electronic information, converting such information to a form compatible with the protocols used by the second network for transport and delivery.

One type of remote network commonly utilized in recent years is the Internet. The term "Internet" is an abbreviation for "Internetwork," and refers commonly to the collection of networks and gateways that utilize the TCP/IP suite of protocols, which are well-known in the art of computer networking. TCP/IP is an acronym for "Transport Control Protocol/Interface Program," a software protocol developed by the Department of Defense for communication between computers. The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the nontextual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well as hypertext topics, are thus linked in a manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilizes hypertext and hypermedia conventions follows a client/server architecture. The "client" is a member of a class or group that uses the services of another class or group to which it is not related. Thus, in computing, a client is a process (i.e., roughly a program or task) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

A request by a user for news can be sent by a client application program to a server. A server is typically a remote computer system accessible over a remote network such as the Internet. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by Hypertext-Transfer Protocol (HTTP). The World Wide Web (WWW) or, simply, the "web," includes those servers adhering to this standard (i.e., HTTP) which are accessible to clients via a computer or data-processing system network address such as a Universal Resource Locator (URL). The network address can be referred to as a Universal Resource Locator address. For example, communication can be provided over a communications medium. In particular, the client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to "web pages" constructed from a Hypertext Markup Language (HTML), or other server-generated data. Each web page can also be referred to simply as a "page." The client and server typically display browsers and other remote network data for a user via a graphical user interface. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., Universal Resource Locator). The Universal Resource Locator address has two basic components, the protocol to be used and the object pathname. For example, the Universal Resource Locator address, "http://www.uspto.gov" (i.e., home page for the U.S. Patent and Trademark Office), specifies a hypertext-transfer protocol ("http") and a pathname of the server ("www.uspto.gov"). The server name is associated with a unique numeric value (TCP/IP address).

The evolution of personal computers over the last decade has accelerated the web and Internet toward useful everyday applications. Nearly every computer sold over the last several years has or will, at some point, become "on-line" to an Internet service provider. Somewhere between 20 and 30 million people around the globe use some form of Internet service on a regular basis. The graphical portion of the World Wide Web itself is usually stocked with more than twenty-two million "pages" of content, with over one million new pages added every month.

Free or relatively inexpensive computer software applications such as Internet "search engines" make it simple to track down sites where an individual can obtain information on a topic of interest. A person may type in a subject or key word and generate a list of network sites (i.e., web sites). Thus, with "home pages" published by thousands of companies, universities, government agencies, museums, and municipalities, the Internet can be an invaluable resource. With a little practice, even new users can skim millions of web pages or thousands of newsgroups, not only for topics of general interest, but also to access precise bits of data. The market for Internet access and related applications is explosive and is growing faster than expected, doubling in size approximately every three months.

A problem associated with the Internet is the dichotomy that exists between the Internet and other forms of digital content delivery, including physical media such as a compact disc (CD) For digital delivery, there still remains a dichotomy between the CD for density and quality, and the Internet for its virtual capacity for storage and global on-demand distribution. This dichotomy has spawned "hybrid media," such as CD-ROMS, which provide access to Web sites or e-mail to the CD-ROMs' producers or artists. Attempts have been made to address issues associated with this dichotomy by providing so called "enhanced" CDs, which combine Red Book audio and Yellow Book CD-ROM data. This combination can provide CD quality audio with multimedia content and interactivity, but it does not provide the benefits of distributed media. Such enhanced CDs are limited to the physical capacity of the CD itself, and cannot be updated without producing an entirely new disc. Hybrid CDs are enhanced CDs or CD-ROMs which provide links to artists' or recording companies' Web sites, or the ability to e-mail artists. However, this hybrid approach has not been accomplished with audio CDs, which account for the vast majority of recorded music sales.

Thus, from the foregoing it can be seen that in the recorded music industry alone, there is a need to effectively combine the richness of on-demand distributed multimedia with the density and quality of audio CDs. The present invention disclosed herein addresses such needs by providing a unique and effective solution which combines conventional audio CDs with on-demand multimedia distribution over the Internet.

SUMMARY OF THE INVENTION

It is therefore an object of the invention to provide an improved information-retrieval method and system.

It is another object of the invention to provide an improved graphical network navigation aid.

The above and other objects are achieved as is now described. A method and system are disclosed in a multimedia computer system for automatically retrieving and presenting data associated with an audio recording having unique identifying indicia therein. In response to playing an audio recording in a multimedia computer system, a unique identifying indicia associated with the audio recording is identified. A listing of codes within the multimedia computer system is automatically searched to find a code corresponding to the unique identifying indicia. In response to finding the code corresponding to the unique identifying indicia, multimedia data is retrieved which corresponds to the unique identifying indicia. The multimedia data can be retrieved from local storage or from a remote network site. The multimedia data corresponding to the unique identifying indicia is then presented in the multimedia computer system, while playing the audio recording in the multimedia computer system.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
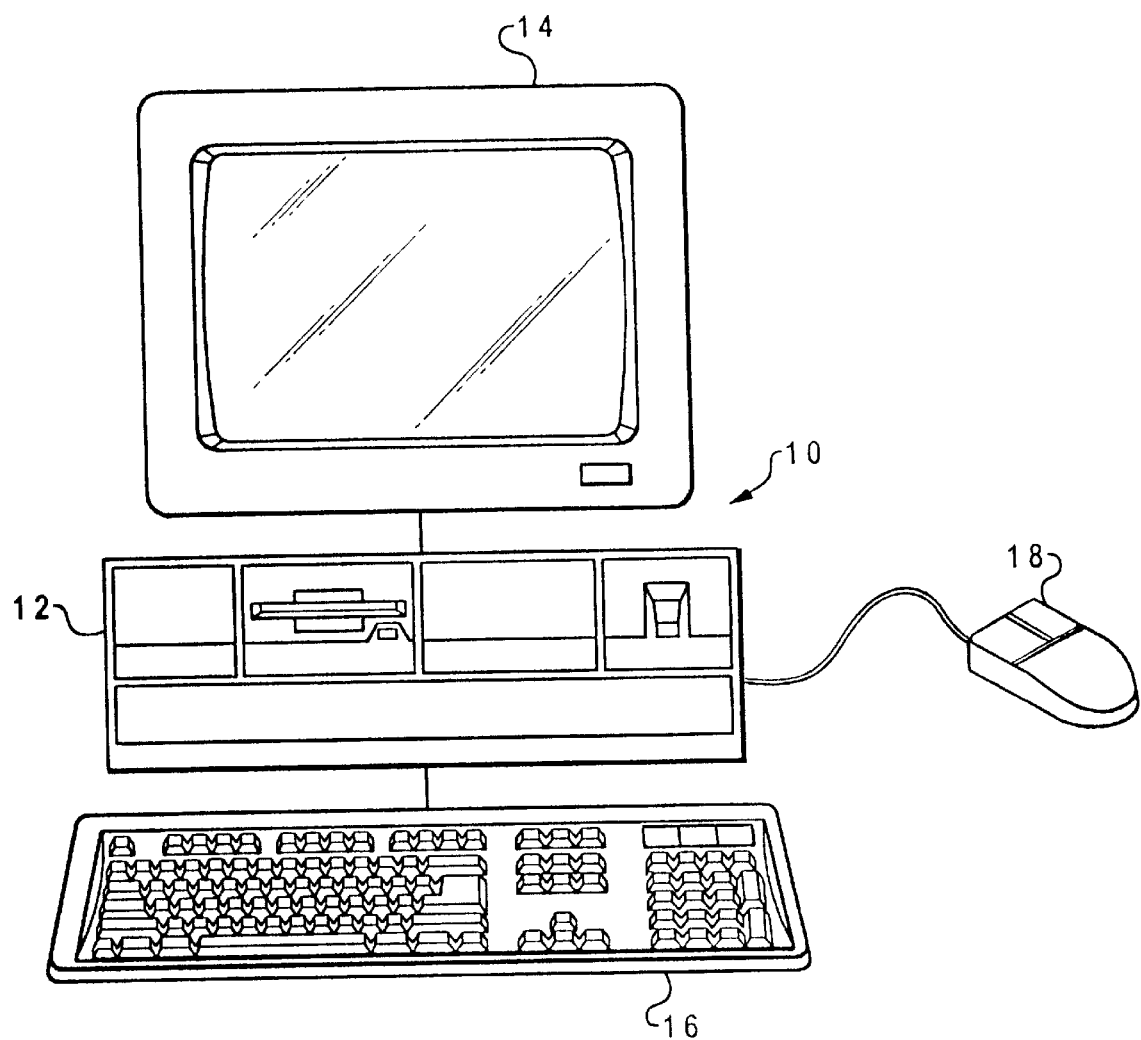
FIG. 1 is a pictorial representation of a data-processing system which can be utilized to implement the method and system of the present invention.

With reference now to the figures and, in particular, with reference to FIG. 1, there is depicted a pictorial representation of a data-processing system in which the present invention may be implemented in accordance with a preferred embodiment of the present invention. A personal computer 10 is depicted which includes a system unit 12, a video display terminal 14, an alphanumeric input device (i.e., keyboard 16) having alphanumeric and other keys, and a mouse 18. An additional input device (not shown), such as a trackball or stylus, also can be included with personal computer 10. Computer 10 can be implemented utilizing any suitable computer, such as an IBM Aptivam computer, a product of International Business Machines Corporation, located in Armonk, N.Y. "Aptiva" is a registered trademark of International Business Machines Corporation.

Although the depicted embodiment involves a personal computer, a preferred embodiment of the present invention may be implemented in other types of data-processing systems, such as, for example, intelligent workstations or mini-computers. Computer 10 also preferably includes a graphical user interface that resides within a machine-readable media to direct the operation of computer 10. Computer 10 also can be implemented utilizing any suitable computer, such as the IBM RISC/6000 computer, a product of International Business Machines Corporation, located in Armonk, N.Y. "RISC SYSTEM/6000" is a trademark of International Business Machines Corporation, and also can be referred to as the "RS/6000."

Figure 2:
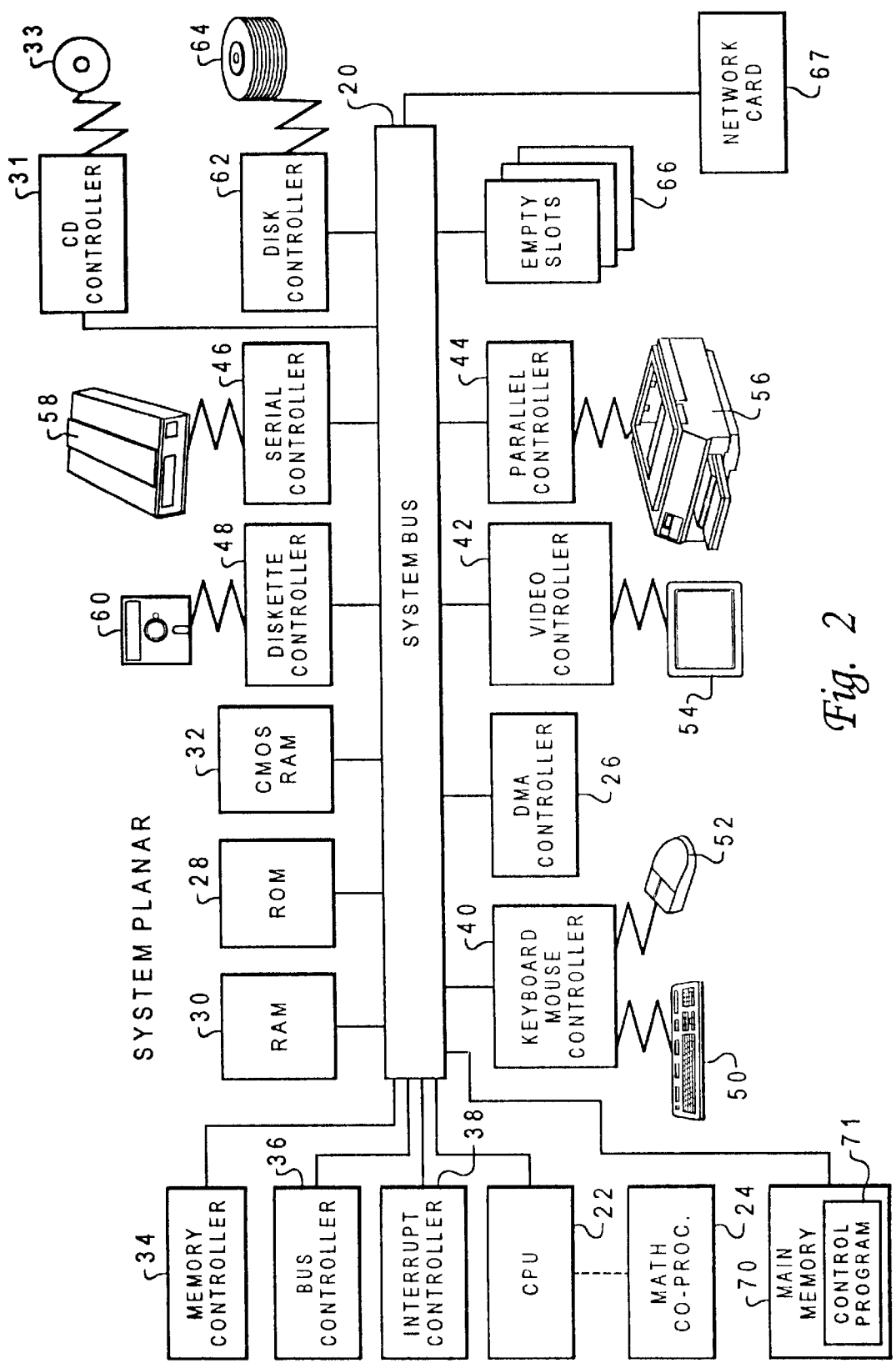
FIG. 2 depicts a block diagram illustrative of selected components in a personal computer system which can be utilized to implement the method and system of the present invention.

Referring now to FIG. 2 there is depicted a block diagram of selected components in personal computer 10 of FIG. 1 in which a preferred embodiment of the present invention may be implemented. Personal computer 10 of FIG. 1 preferably includes a system bus 20, as depicted in FIG. 2. System bus 20 is utilized for interconnecting and establishing communication between various components in personal computer 10. Microprocessor or central processing unit (CPU) 22 is connected to system bus 20 and also may have numeric co-processor 24 connected to it. Direct memory access ("DMA") controller 26 also is connected to system bus 20 and allows various devices to appropriate cycles from CPU 22 during large input/output ("I/O") transfers. Read-only memory ("ROM") 28 and random-access memory ("RAM") 30 are also connected to system bus 20. ROM 28 is mapped into the microprocessor 22 address space in the range from 640K to 1 megabyte. CMOS RAM 32 is attached to system bus 20 and contains system-configuration information. Any suitable machine-readable media may retain the graphical user interface of computer 10 of FIG. 1, such as RAM 30, ROM 28, a magnetic diskette, magnetic tape, or optical disk.

Also connected to system bus 20 are memory controller 34, bus controller 36, and interrupt controller 38 which serve to aid in the control of data flow through system bus 20 between various peripherals, adapters, and devices. System unit 12 of FIG. 1 also contains various I/O controllers, such as those depicted in FIG. 2: keyboard and mouse controller 40, video controller 42, parallel controller 44, serial controller 46, and diskette controller 48. Keyboard and mouse controller 40 provide a hardware interface for keyboard 50 and mouse 52. Video controller 42 provides a hardware interface for video display terminal 54.

Parallel controller 44 provides a hardware interface for devices, such as printer 56. Serial controller 46 provides a hardware interface for devices, such as a modem 58. Diskette controller 48 provides a hardware interface for floppy-disk unit 60. Other technologies also can be utilized in conjunction with CPU 22, such as touch-screen technology or human voice control.

Main memory 70 is connected to system bus 20, and includes a control program 71. Control program 71 resides within main memory 70 and contains instructions that when executed on CPU 22 carry out the operations depicted in the logic flowchart of FIG. 7 described herein. The computer program product also can be referred to as a program product. Control program 71 can support a number of Internet-access tools including, for example, an HTTP-compliant web "browser." Known browser software applications include: Netscape Navigator® ("Netscape") Mosaic, and the like. Netscape, in particular, provides the functionality specified under HITP. "Netscape" is a trademark of Netscape, Inc. Mosaic-brand browser is available from the National Center for Supercomputing Applications (NCSA) in Urbana-Champaign, Illinois. The present invention is designed to operate with any of these known or developing web browsers, in order to provide network navigation aids for web pages displayed with three-dimensional graphics.

Control program 71 also can support other remote network services, such as the file-transfer protocol (FTP) service, which facilitates the transfer and sharing of files across remote networks such as the Internet. Control program 71 can further support remote network services, such as remote terminal access (Telnet), which allows users to log onto computers coupled to the network. In addition, control program 71 additionally can support services, such as simple mail-transfer protocol (SMTP) or e-mail, and network news-transfer protocol (NNTP) or "Usenet," well-known in the art of computer networking.

It is important to note that, while the present invention has been (and will continue to be) described in the context of a fully functional computer system, those skilled in the art can appreciate that the present invention is capable of being distributed as a program product in a variety of forms and that the present invention applies equally regardless of the particular type of signal-bearing media utilized to actually carry out the distribution. Examples of signal-bearing media include: recordable-type media, such as floppy discs, hard-disk drives, audio CDs and CD ROMs, and transmission-type media, such as digital and analog communication links.

FIG. 2 additionally depicts a CD controller 31 for controlling a CD system 33. CD system 33 may run audio CDs or CD-ROMs, both well known in the art of digital electronic media. CD system 33 is a sound or data reproduction system that utilizes light to detect audio and data signals produced by digital recording on a CD. CD system 33 differs from other data or sound reproduction systems in that there is no physical contact between the pick-up and the recording or recorded data, which minimizes wear. An information layer is buried below the surface of the audio CD or CD-ROM, which minimizes errors in sound or data reproduction due to dust or other marks on the surface.

The information is retrieved from only one side of the CD (i.e., the "back" or non-labelled side), and the track spirals outward from the center of the CD, rather than inward as was the case with old-style vinyl records, which audio CDs have largely replaced. The CD, whether audio or CD-ROM based, utilizes a constant linear velocity of track relative to pick-up so that rotational speed is a function of the radius of the track, and varies as the pick-up moves across the CD. When an audio CD is loaded into a CD player of CD system 33, it must be secured to the spindle.

Some types of CD players utilize a motorized drawer, while others operate a clamp when the lid is lowered to hold the CD in place. The essential component of the pick-up is a small low-power injection laser that continuously emits coherent light, which is focused as a small spot onto the reflecting surface of the CD. The laser is required to be disabled whenever the mechanism is activated. CD system 33 can operate both audio CDs and CD-ROMs. The term CD-ROM is an acronym for "compact disc read-only memory." A CD-ROM is a form of CD storage characterized by high capacity (e.g., 600 megabytes) and the use of laser optics rather than magnetic means for reading data.

Expansion cards also may be added to system bus 20, such as disk controller 62, which provides a hardware interface for hard-disk unit 64. Empty slots 66 are provided so that other peripherals, adapters, and devices may be added to system unit 12 of FIG. 1. A network card 67 additionally can be connected to system bus 20 in order to link system unit 12 of FIG. 1 to other data-processing system networks in a client/server architecture or to groups of computers and associated devices which are connected by communications facilities. Those skilled in the art will appreciate that the hardware depicted in FIG. 2 may vary for specific applications. For example, other peripheral devices, such as: optical-disk media, audio adapters, or chip-programming devices, such as PAL or EPROM programming devices and the like also may be utilized in addition to or in place of the hardware already depicted. Note that any or all of the above components and associated hardware may be utilized in various embodiments. However, it can be appreciated that any configuration of the aforementioned system may be used for various purposes according to a particular implementation.

Figure 3:
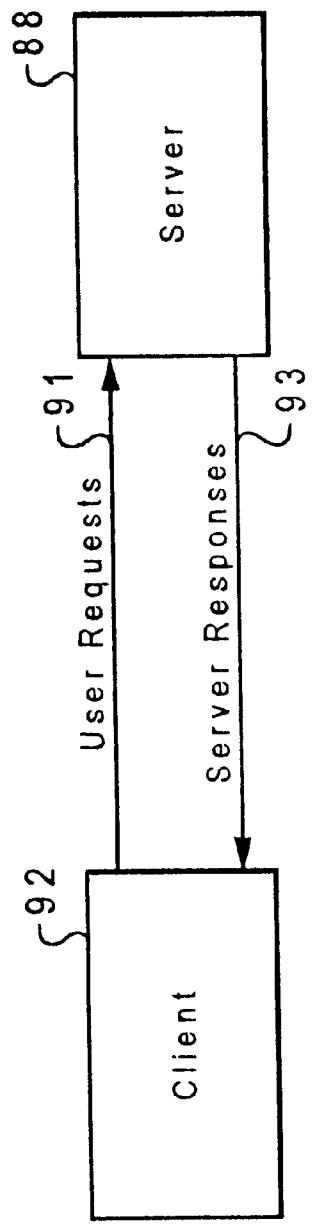
FIG. 3 illustrates a block diagram illustrative of a client/server architecture which can be utilized to implement the method and system of the present invention.
Figure 4:
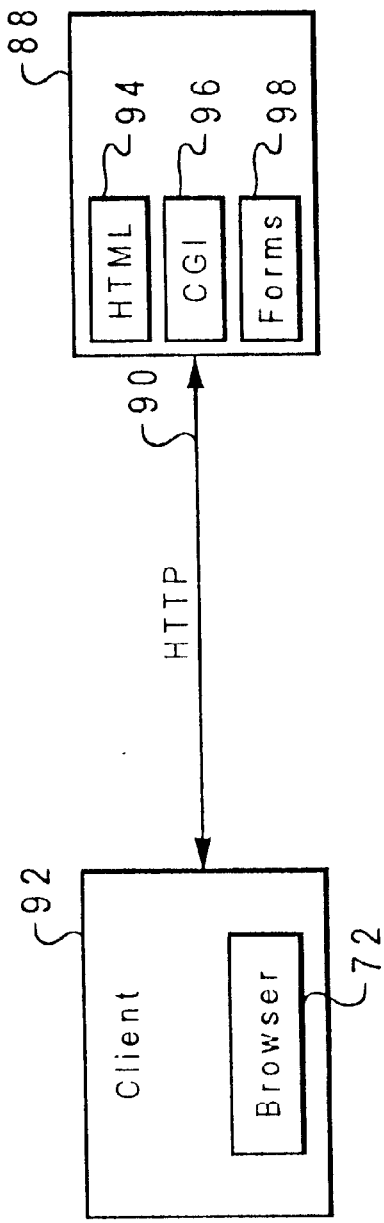
FIG. 4 depicts a detailed block diagram illustrative of a client/server architecture which can be utilized to implement the method and system of the present invention.
Figure 5:
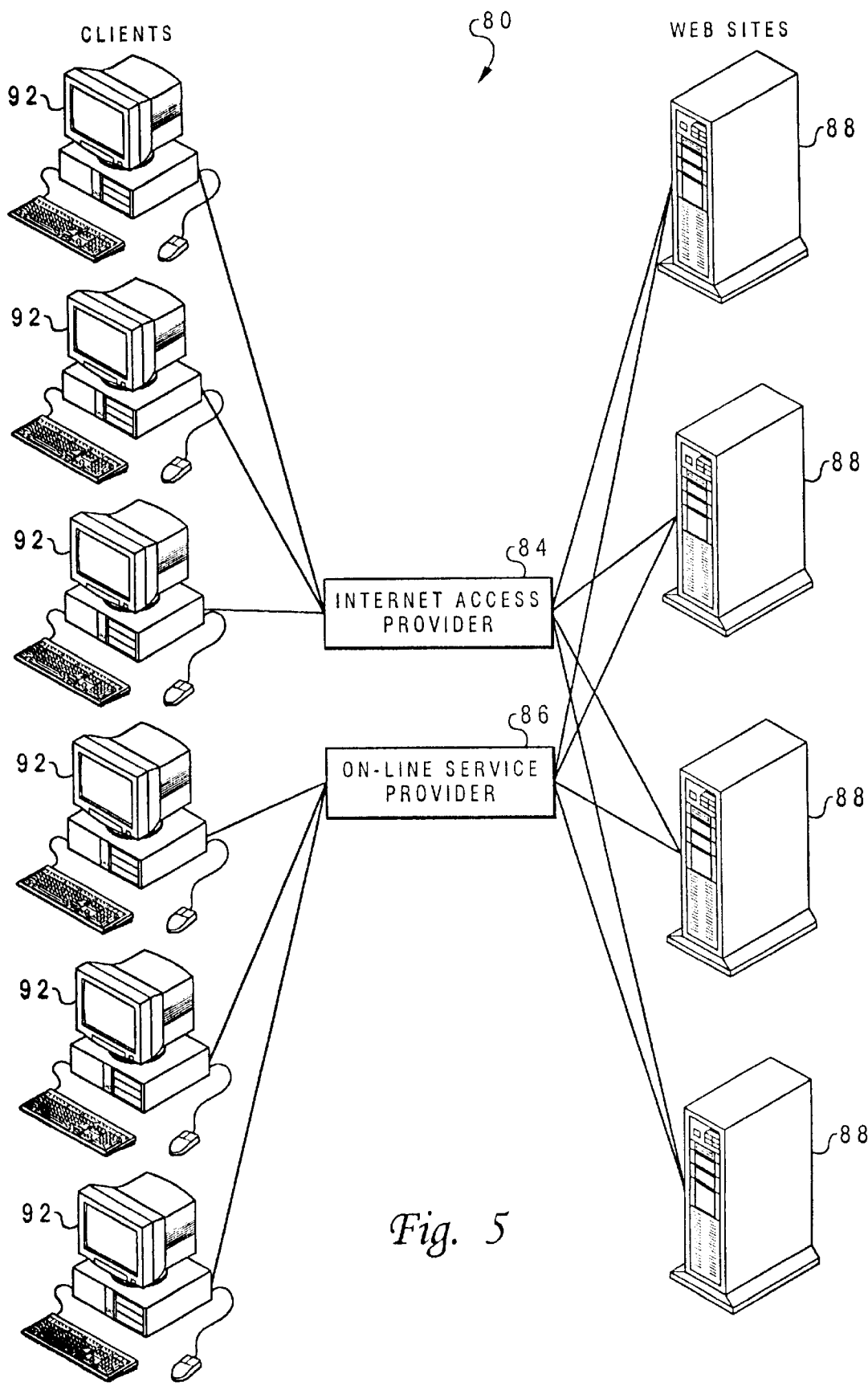
FIG. 5 is a diagram illustrative of a computer network which can be implemented in accordance with the method and system of the present invention.

In FIG. 3, FIG. 4, and FIG. 5, like parts are indicated by like numbers. FIG. 3 illustrates a block diagram illustrative of a client/server architecture which can be utilized in accordance with the method and system of the present invention. In FIG. 3, user requests 91 for news are sent by a client application program 92 to a server 88. Server 88 can be a remote computer system accessible over a remote network such as the Internet. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system and communicate with the first computer system over a communications medium, thus providing distributed functionality and allowing multiple clients to take advantage of the information-gathering capabilities of the server.

FIG. 4 illustrates a detailed block diagram of a client/server architecture which can be utilized in accordance with the method and system of the present invention. Although the client and server are processes which are operative within two computer systems, these processes being generated from a high-level programming language (e.g., PERL), which is interpreted and executed in a computer system at run-time (e.g., a workstation), it can be appreciated by one skilled in the art that they may be implemented in a variety of hardware devices, either programmed or dedicated.

Client 92 and server 88 communicate using the functionality provided by HTTP. Active within client 92 is a first process, browser 72, which establishes the connections with server 88, and presents information to the user. Such browsers are often referred to in the art of computer networking as "web browsers." Any number of commercially or publicly available browsers may be utilized in accordance with a preferred embodiment of the present invention. For example, the Mosaic-brand browser available from the National Center for Supercomputing Applications (NCSA) in Urbana-Champaign, Ill., can be utilized with a preferred embodiment of the present invention. Other browsers, such as Netscape™, Netcruiser, or the Lynx-brand browsers or others which are available and provide the functionality specified under HTTP can be utilized with the present invention.

Server 88 executes the corresponding server software which presents information to the client in the form of HTTP responses 90. The HTTP responses 90 correspond with web "pages," which can be represented by utilizing Hypertext Markup Language (HTML), or other data generated by server 88. For example, under the Mosaic-brand browser, in addition to HTML functionality 94 provided by server 88, a Common Gateway Interlace (CGI) 96 is provided which allows the client program to direct server 88 to commence execution of a specified program contained within server 88. This may include a search engine which scans received information in the server for presentation to the user controlling the client. Using this interface, and HTTP responses 90, the server may notify the client of the results of that execution upon completion. Common Gateway Interlace (CGI) 96 is one form of a "gateway," a device utilized to connect dissimilar networks (i.e., networks utilizing different communication protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This is provided by the "fill-in-forms" functionality (i.e., forms 98), which is provided by some browsers, such as the Mosaic brand browser described herein. This functionality allows the user via a client application program to specify terms in which the server causes an application program to function (e.g., terms or keywords contained in the types of stories/articles which are of interest to the user).

FIG. 5 is a diagram illustrative of a computer network 80 which can be implemented in accordance with the method and system of the present invention. Computer network 80 is representative of a remote network, specifically the Internet, a known computer network based on the client-server model discussed earlier. Conceptually, the Internet includes a large network of servers 88 which are accessible by clients 92, typically users of personal computers, through some private Internet-access provider 84 (e.g., such as Internet America) or an on-line service provider 86 (e.g., such as America On-Line, Prodigy, Compuserve, and the like). Each of the clients 92 may run a browser, a known software tool utilized to access servers 88 via the access providers 84. Each server 88 operates a web site which supports files in the form of documents and pages. A network path to servers 88 is identified by a Universal Resource Locator having a known syntax for defining a network collection.

Figure 6:
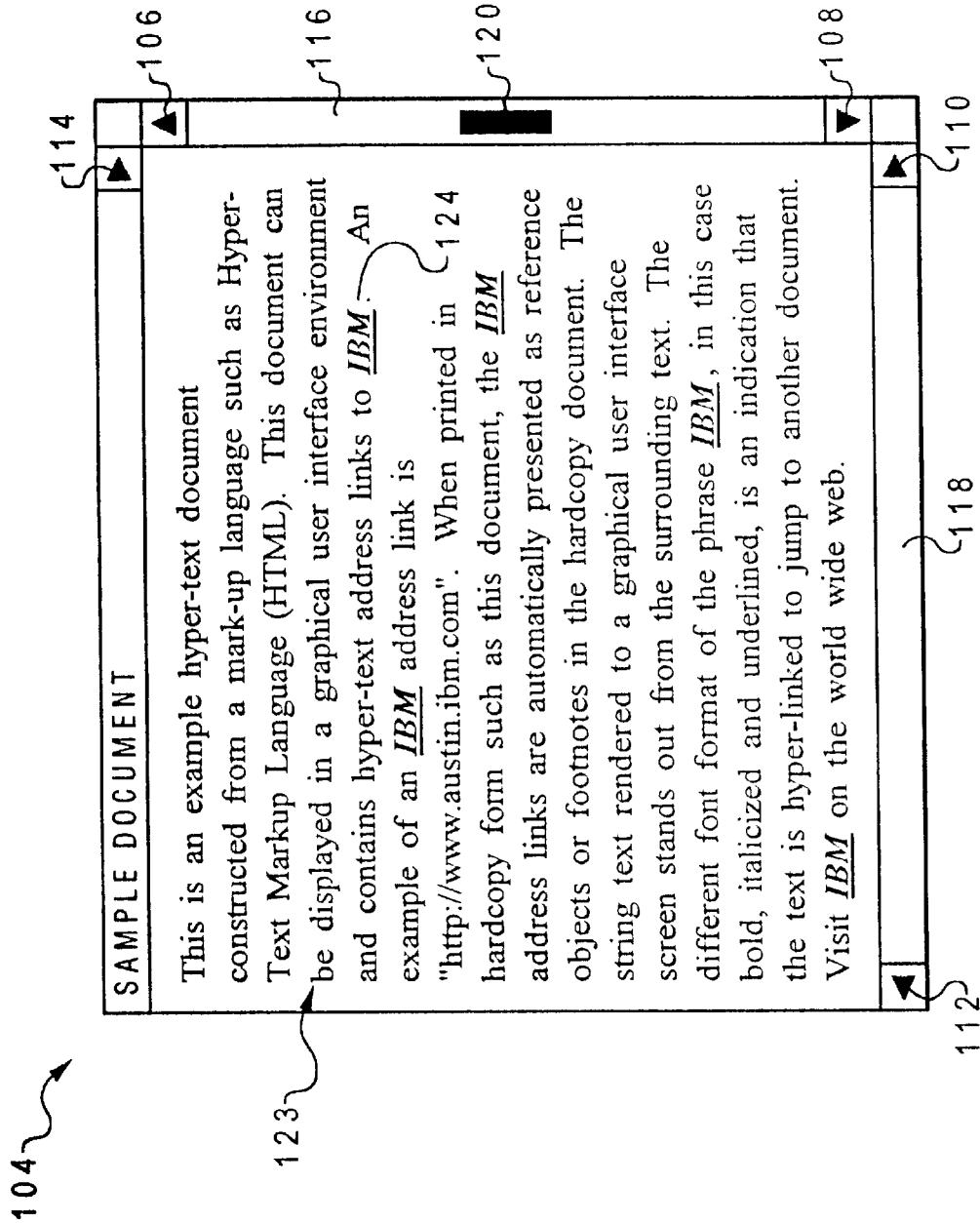
FIG. 6 illustrates a hypertext document contained within a graphical user interface window which can be utilized to implement the method and system of the present invention.

FIG. 6 illustrates an example hypertext document 123 contained within a graphical user interface window 104 which can be utilized in accordance with the method and system of the present invention. Window 104 displays a portion of a hypertext document 123 constructed from a mark-up language, such as Hypertext Mark-up Language (HTML). The size and position of elevator 120 within scroll bar 116 corresponds to the size and position of the current viewable page in relation to hypertext document 123. Hypertext document 123 can be accessed from a data-processing system contained within a remote network, such as the Internet.

In the example of FIG. 6, in view of the fact that hypertext document 123 includes too many pages to view simultaneously, the user can position a mouse cursor over up-arrow section 106 or down-arrow section 108 of scroll bar 116 and click a pointing device (e.g., a mouse) to scroll hypertext document 123 upward or downward, as appropriate. A vertical scroll bar 118 includes arrow section 112 and arrow section 110 for scrolling hypertext document 123 respectively left or right. Also, an optional arrow section 114 allows a user to scroll the document right. Thus, the graphical user interface that contains window 104 and hypertext document 123 is a type of computer display format that enables a user to choose commands, start programs, and see lists of files and other options by pointing to pictorial representations (i.e., icons) and lists of menu items on the screen. Choices can generally be activated either with a keyboard or a mouse.

Hypertext document 123 contains specific string text 124 rendered on the screen by the graphical user interface to stand out from the surrounding text. String text 124 is rendered in a different format. In the example of FIG. 6, string text 124 is rendered as IBM. The different font format of string text 124 is an indication that the text is hyper-linked to "jump" to another document. When a user "clicks" on string text 124 with a mouse or other pointing device, the graphical user interface shifts the presently viewed hypertext document 123 to another hyper-linked document.

Figure 7:
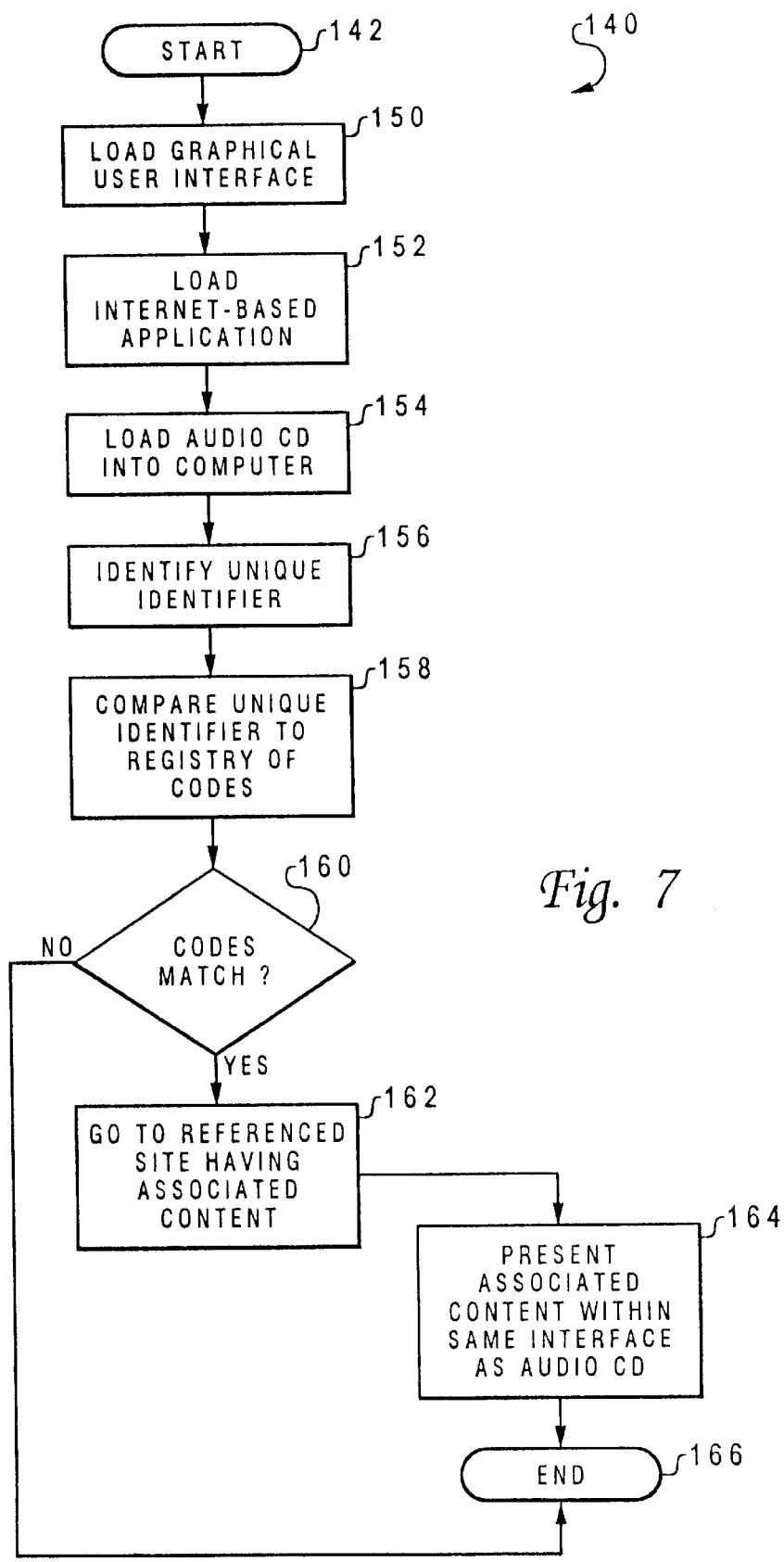
FIG. 7 depicts a flowchart of operations illustrating a method for delivering content associated with audio recordings in accordance with a preferred embodiment of the present invention.

FIG. 7 depicts a flowchart of operations 140 illustrating a method for delivering content associated with audio recordings such as audio CDs in accordance with a preferred embodiment of the present invention. It can be appreciated by those skilled in the art that FIG. 7 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer 10 of FIG. 1 and FIG. 2, in processing electrical or other (e.g. mechanical, chemical) physical signals to generate other desired physical signals.

Thus, as depicted at block 142, the process is initiated. As illustrated at block 150, a graphical user interface is loaded into a working directory of a computer system, such as computer 10 of FIG. 1 and FIG. 2. As described at block 152, an Internet-based application such as a web browser is loaded into the computer system. The computer system is included within a network based on the is, client-server relationship as described herein. The computer system in which the web browser is displayed function as a client. It can be assumed for purposes of illustration that the web browser contains hyper-text links of the type described in the text relating to FIG. 6 herein.

As depicted at block 154, an audio CD is loaded onto a CD player incorporated within a computer system such as computer 10 of FIG. 1 and FIG. 2. The CD contains a unique identifier encoded physically in the CD. This unique identifier is utilized to identify unique CD titles and is based on the Red Book audio CD standard, well known in the art of digitally recorded data. As described at block 156, upon inserting an audio CD in the computer, information is queried from disc and a representation of the CD, including the CDs unique identifier, is displayed within the graphical user interface utilized by the computer.

As illustrated at block 158, the unique identifier encoded on the disc is compared to a registry of codes, either on local storage or on a remote server. The registered codes provide a directory to the server location that includes content associated with the unique CD title. If no codes are found to match, as indicated at block 160, then the process ends, as illustrated at block 166. However, if matched codes are identified, then the process continues, also as depicted at block 160. As described at block 162, the identified referenced site having the required associated content is accessed (e.g., over the Internet). The associated content, which can include images, text, video, and so forth, is gathered from the referenced site and presented, as described at block 164, within the same interface as that in which the audio CD is represented and interacted with accordingly.

Thus, those skilled in the art will appreciate that the invention described herein with reference to a preferred embodiment accommodates audio CDs, which accounts for the majority of sales in the recorded industry. In addition, the invention described herein can integrate multimedia content with CD audio in an effective user interface, which allows record companies, for example, to quickly and easily integrate rich multimedia content with existing and future CDs, without impacting existing CDs or existing processes utilized for producing CDs.

Figure 8:
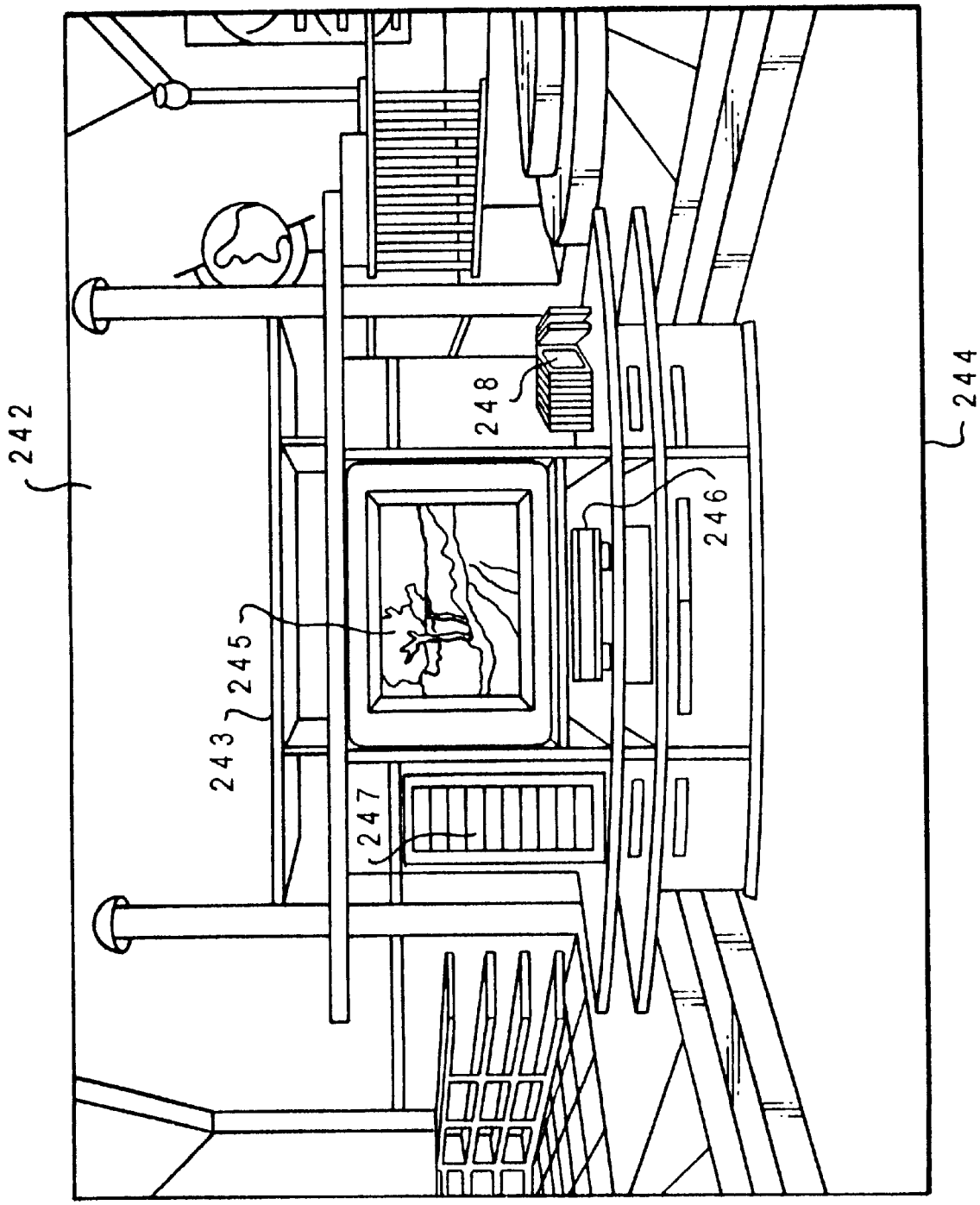
FIG. 8 illustrates a pictorial representation of an audio/video system in which a preferred embodiment of the present invention may be implemented.

FIG. 8 illustrates a pictorial representation 244 of a multimedia audio/video system 242 in which a preferred embodiment of the present invention may be implemented. Audio/video system 242 includes a video display unit 245, a CD player 246, and an audio unit 247. Those skilled in the art will appreciate that audio/video system 242 can be contained within a housing unit 243, commonly referred to in practice as an "entertainment center." A compact disc rack 248 is indicated in FIG. 8 to demonstrate that such compact discs can be utilized in accordance with a preferred embodiment of the present invention. It can be appreciated by those skilled in the art that audio/video system 242 can comprise an audio/video system which is "linked" to the Internet in the same manner as described in the text related to FIG. 3 to FIG. 5 herein.

Figure 9:
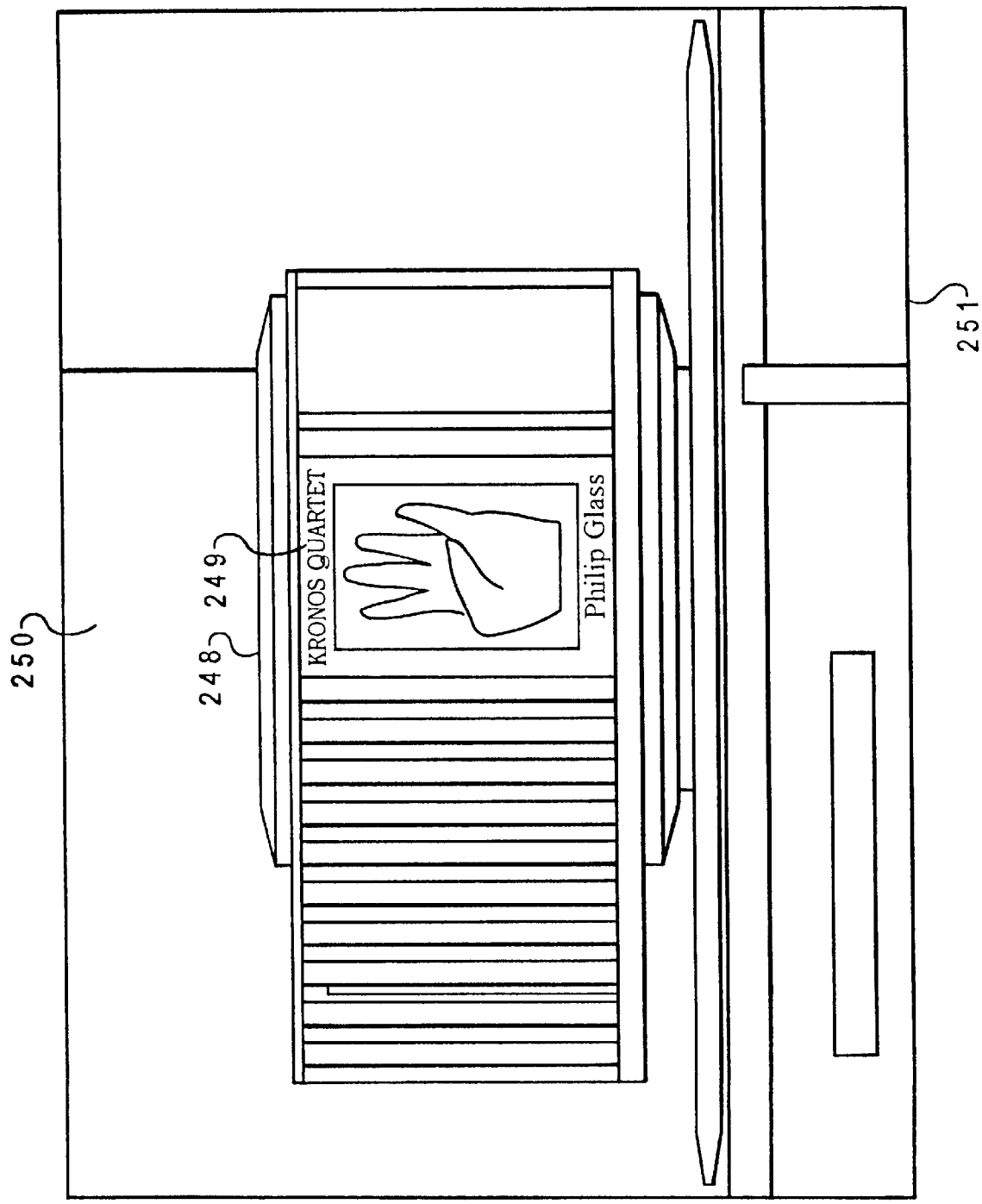
FIG. 9 illustrates a pictorial representation of compact disks which may be utilized in accordance with a preferred embodiment of the present invention.

FIG. 9 illustrates a pictorial representation 251 of compact discs 250 which may be utilized in accordance with a preferred embodiment of the present invention. A sample compact disc is indicated by CD 249, which is contained compact disc rack 248. Thus, a user can load a standard CD such as CD 249 into CD player 246. Audio/video system 242 identifies unique identifying indicia associated with CD 249. A listing of codes corresponding to the unique identifying indicia is searched. This list can be searched via the internet by linking to an appropriate site as described herein or can include data contained in a memory of audio/system 242.

Although the Internet can be utilized in accordance with the example depicted in FIG. 8 and FIG. 9, those skilled in the art will appreciate that the Internet and "web browsers" as described herein are not necessary features of the present invention. When a code corresponding to the unique identifying indicia is identified, data corresponding to the unique identifying indicia is retrieved and then presented via the multimedia audio/video system 242 while CD 249 is played on CD player 246. Corresponding data can include multimedia data such as photographic images, audio data (e.g., music), graphical data, and/or textual data. For example, such data may included additional music which complements the music already contained on the physical audio CD itself in the form of recorded data. Such corresponding data may also include additional artwork or lyrics that was not presented in the original CD package, but which further complements the CD.

Those skilled in the art will appreciate that although these are examples of multimedia data, other types of corresponding data other than multimedia (e.g., program codes, encrypted data, etc.) may also be utilized in accordance with a preferred embodiment of the present invention. The unique identifying indicia is a unique identifier encoded on the physical CD itself. The unique identifier is based on the "Red Book" audio standard, well-known in the electronic recording arts. Such corresponding data can be retrieved from "web sites," or from other memory sources (e.g., other computers, disk drives, a memory unit within the audio/video system itself, and so forth) for storing data.

While the invention has been particularly shown as described with reference to a preferred embodiment, it will be understood by those skilled in the art that various changes in form and detail may be made therein without departing from the spirit and scope of the invention. Utilization of the Internet in association with the method and system described herein is not a necessary feature of the present invention. For example, the present invention is applicable to other communication networks besides the Internet, including so-called "intranets" (i.e., networks that are internal to particular organizations). The Internet, as described herein, is merely one example of a remote network that can be utilized in accordance with a preferred embodiment of the present invention. It is therefore contemplated that such modifications can be made without departing from the spirit or scope of the present invention as defined in the appended claims.

What is claimed is:

1. A method in a multimedia computer system for automatically retrieving and presenting data associated with an audio recording said method comprising the steps of:

storing a unique identifying indicia associated with said audio recording, said unique identifying indicia being stored on a storage media separately from said audio recording, said indicia conforming to a Red Book Audio CD standard, said audio recording being stored on said storage media, wherein said unique identifying indicia is accessed without accessing said audio recording;

reading said unique identifying indicia associated with said audio recording from said storage media, in response to playing an audio recording in a multimedia computer system;

searching a listing of codes for a code corresponding to said unique identifying indicia;

retrieving multimedia data corresponding to said unique identifying indicia, in response to finding said code corresponding to said unique identifying indicia; and presenting said multimedia data corresponding to said unique identifying indicia in said multimedia computer system, while playing said audio recording in said multimedia computer system.

2. The method of claim 1 wherein the step of identifying said unique identifying indicia associated with said audio recording, in response to playing an audio recording in a multimedia computer system, further comprises the step of:

identifying said unique identifying indicia associated with said audio recording, wherein said audio recording comprises an audio recording stored on a compact disc, in response to playing an audio recording in a multimedia computer system.

3. The method of claim 2 wherein the step of retrieving multimedia data corresponding to said unique identifying indicia, in response to finding said code corresponding to said unique identifying indicia, further comprises the step of:

retrieving multimedia data corresponding to said unique identifying indicia from a remote network site linked to said multimedia computer system, in response to finding said code corresponding to said unique identifying indicia.

4. The method of claim 3 wherein the step of searching a listing of codes for a code corresponding to said unique identifying indicia, further comprising the step of:

searching a listing of codes for a code corresponding to said unique identifying indicia, wherein said listing of codes is located at a remote network site.

5. The method of claim 4 wherein the step of presenting said multimedia data corresponding to said unique identifying indicia in said multimedia computer system, while playing said audio recording in said multimedia computer system, further comprises the step of:

presenting said multimedia data corresponding to said unique identifying indicia in said multimedia computer system, while playing said audio recording in said multimedia computer system, wherein said multimedia data includes photographic data, textual data, audio data, and graphical data.

6. The method of claim 5 wherein the step of identifying said unique identifying indicia associated with said audio recording, in response to playing an audio recording in a multimedia computer system, further comprises the step of:

identifying said unique identifying indicia associated with said audio recording, such that said unique identifying indicia comprises an audio compact disc unique identifier encoded physically on said audio compact disc, in response to playing an audio recording in a multimedia computer system, wherein said unique identifying indicia is encoded separately from said audio recording.

7. A system for automatically retrieving and presenting data associated with an audio recording having unique identifying indicia therein, wherein said system includes a multimedia computer, said system comprising:

means for storing a unique identifying indicia associated with said audio recording, said unique identifying indicia being stored on a storage media separately from said audio recording, said indicia conforming to a Red Book Audio CD standard, said audio recording being stored on said storage media, wherein said unique identifying indicia is accessed without accessing said audio recording;

reading means for reading said unique identifying indicia associated with said audio recording from said storage media, in response to playing an audio recording in a multimedia computer system;

search means for searching a listing of codes for a code corresponding to said unique identifying indicia;

retrieval means for retrieving multimedia data corresponding to said unique identifying indicia, in response to finding said code corresponding to said unique identifying indicia; and presentation means for presenting said multimedia data corresponding to said unique identifying indicia in said multimedia computer system, while playing said audio recording in said multimedia computer system.

8. The system of claim 7 wherein said audio recording comprises an audio compact disc recording.

9. The system of claim 8 wherein said retrieval means for retrieving multimedia data corresponding to said unique identifying indicia, in response to finding said code corresponding to said unique identifying indicia, further comprises:

retrieval means for retrieving multimedia data corresponding to said unique identifying indicia from a remote network site linked to said multimedia computer system, in response to finding said code corresponding to said unique identifying indicia.

10. The system of claim 9 wherein said search means for searching a listing of codes for a code corresponding to said unique identifying indicia, further comprises:

means for searching a listing of codes for a code corresponding to said unique identifying indicia, wherein said listing of codes is located at a remote network site.

11. The system of claim 10 wherein said multimedia data includes photographic data, textual data, audio data and graphical data.

12. The system of claim 11 wherein said identifying means for identifying said unique identifying indicia associated with said audio recording, in response to playing an audio recording in a multimedia computer system, further comprises:

identifying means for identifying said unique identifying indicia associated with said audio recording, in response to playing an audio recording in a multimedia computer system, such that said unique identifying indicia comprises an audio compact disc unique identifier encoded physically on said audio compact disc.

13. A program product residing in computer memory in a computer system for automatically retrieving and presenting data associated with an audio recording having unique identifying indicia therein, wherein said system includes a multimedia computer, said program product comprising:

means for storing a unique identifying indicia associated with said audio recording, said unique identifying indicia being stored on a storage media separately from said audio recording, said indicia conforming to a Red Book Audio CD standard, said audio recording being stored on said storage media, wherein said unique identifying indicia is accessed without accessing said audio recording;

reading means for reading said unique identifying indicia associated with said audio recording from said storage media, in response to playing an audio recording in a multimedia computer system;

search means for searching a listing of codes for a code corresponding to said unique identifying indicia;

retrieval means for retrieving multimedia data corresponding to said unique identifying indicia, in response to finding said code corresponding to said unique identifying indicia;

presentation means for presenting said multimedia data corresponding to said unique identifying indicia in said multimedia computer system, while playing said audio recording in said multimedia computer system; and signal bearing media bearing said identifying means, said search means, said retrieval means, and said presentation means.

14. The program product of claim 13 wherein said audio recording comprises an audio recording stored on a compact disc.

15. The program product of claim 14 wherein said retrieval means for retrieving multimedia data corresponding to said unique identifying indicia, in response to finding said code corresponding to said unique identifying indicia, further comprises:

retrieval means for retrieving multimedia data corresponding to said unique identifying indicia from a remote network site linked to said multimedia computer system, in response to finding said code corresponding to said unique identifying indicia.

16. The program product of claim 15 wherein said search means for searching a listing of codes for a code corresponding to said unique identifying indicia, further comprises:

means for searching a listing of codes for a code corresponding to said unique identifying indicia, wherein said listing of codes is located at a remote network site.

17. The program product of claim 16 wherein said multimedia data includes photographic data, textual data, audio data, and graphical data.

18. The program product of claim 17 wherein said identifying means for identifying said unique identifying indicia associated with said audio recording, in response to playing an audio recording in a multimedia computer system, further comprises:

identifying means for identifying said unique identifying indicia associated with said audio recording, in response to playing an audio recording in a multimedia computer system, such that said unique identifying indicia comprises an audio compact disc unique identifier encoded physically on said audio compact disc.

19. The program product of claim 18 wherein said signal bearing media further comprises transmission media.

20. The program product of claim 18 wherein said signal bearing media further comprises recordable media.

21. A method in a multimedia computer system for automatically retrieving and presenting data associated with an audio recording, said method comprising the steps of:

storing a unique identifying indicia associated with said audio recording, said unique identifying indicia being stored on a storage media separately from said audio recording, said indicia conforming to a Red Book Audio CD standard, said audio recording being stored on said storage media, wherein said unique identifying indicia is accessed without accessing said audio recording;

reading said unique identifying indicia associated with said audio recording from said storage media, in response to playing an audio recording in a multimedia computer system;

searching a listing of codes for a code corresponding to said unique identifying indicia;

retrieving multimedia data corresponding to said unique identifying indicia from a remote computer system coupled to said multimedia computer system utilizing a network in response to finding said code corresponding to said unique identifying indicia, wherein said multimedia data is stored within said remote computer system; and presenting said multimedia data corresponding to said unique identifying indicia utilizing said multimedia computer system, while playing said audio recording in said multimedia computer system.

22. The method of claim 21 wherein the step of searching a listing of codes for a code corresponding to said unique identifying indicia, further comprising the step of:

searching a listing of codes for a code corresponding to said unique identifying indicia, wherein said listing of codes is located at a remote computer system coupled to said multimedia computer system utilizing a network.

23. The method of claim 22 wherein the step of presenting said multimedia data corresponding to said unique identifying indicia in said multimedia computer system, while playing said audio recording in said multimedia computer system, further comprises the step of:

presenting said multimedia data corresponding to said unique identifying indicia in said multimedia computer system, while playing said audio recording in said multimedia computer system, wherein said multimedia data includes photographic data, textual data, audio data, and graphical data.

24. The method of claim 23 wherein the step of identifying said unique identifying indicia associated with said audio recording, in response to playing an audio recording in a multimedia computer system, further comprises the step of:

identifying said unique identifying indicia associated with said audio recording, such that said unique identifying indicia comprises an audio compact disc unique identifier encoded physically on said storage media, in response to playing an audio recording in a multimedia computer system, wherein said unique identifying indicia is encoded separately from said audio recording on said storage media.

25. The method according to claim 24, wherein the step of retrieving multimedia data corresponding to said unique identifying indicia from a remote computer system coupled to said multimedia computer system utilizing a network further comprises the step of retrieving multimedia data corresponding to said unique identifying indicia from a remote computer system coupled to said multimedia computer system utilizing the Internet.

26. A multimedia computer system for automatically retrieving and presenting data associated with an audio recording, comprising:

means for storing a unique identifying indicia associated with said audio recording, said unique identifying indicia being stored on a storage media separately from said audio recording, said audio recording being stored on said storage media, wherein said unique identifying indicia is accessed without accessing said audio recording;

means for identifying said unique identifying indicia associated with said audio recording, in response to playing an audio recording in a multimedia computer system;

means for searching a listing of codes for a code corresponding to said unique identifying indicia;

means for retrieving multimedia data corresponding to said unique identifying indicia from a remote computer system coupled to said multimedia computer system utilizing a network in response to finding said code corresponding to said unique identifying indicia, wherein said multimedia data is stored within said remote computer system; and means for presenting said multimedia data corresponding to said unique identifying indicia utilizing said multimedia computer system, while playing said audio recording in said multimedia computer system.

27. The system of claim 26 wherein said means for searching a listing of codes for a code corresponding to said unique identifying indicia, further comprises means for searching a listing of codes for a code corresponding to said unique identifying indicia, wherein said listing of codes is located at a remote computer system coupled to said multimedia computer system utilizing a network.

28. The system of claim 27 wherein said means for presenting said multimedia data corresponding to said unique identifying indicia in said multimedia computer system, while playing said audio recording in said multimedia computer system, further comprises means for presenting said multimedia data corresponding to said unique identifying indicia in said multimedia computer system, while playing said audio recording in said multimedia computer system, wherein said multimedia data includes photographic data, textual data, audio data, and graphical data.

29. The system of claim 28 wherein said means for identifying said unique identifying indicia associated with said audio recording, in response to playing an audio recording in a multimedia computer system, further comprises means for identifying said unique identifying indicia associated with said audio recording, such that said unique identifying indicia comprises an audio compact disc unique identifier encoded physically on said storage media, in response to playing an audio recording in a multimedia computer system, wherein said unique identifying indicia is encoded separately from said audio recording on said storage media.

30. The method according to claim 29, wherein said means for retrieving multimedia data corresponding to said unique identifying indicia from a remote computer system coupled to said multimedia computer system utilizing a network further comprises means for retrieving multimedia data corresponding to said unique identifying indicia from a remote computer system coupled to said multimedia computer system utilizing the Internet.

* * * * *

UNITED STATES PATENT AND TRADEMARK OFFICE
CERTIFICATE OF CORRECTION

PATENT NO. : 6,195,693 B1
DATED : February 27, 2001
INVENTOR(S) : Berry et al.

It is certified that error appears in the above-identified patent and that said Letters Patent is hereby corrected as shown below:

<u>Column 13,</u>
Line 22, please delete "compact disc" and insert -- [compact disc] --.
Line 22, please insert -- stored on a compact disc -- after the word "recording" at the end of sentence.

Signed and Sealed this

Eighth Day of January, 2002

Attest:

JAMES E. ROGAN
Attesting Officer     Director of the United States Patent and Trademark Office